US006327281B1

(12) United States Patent
Yin (10) Patent No.: US 6,327,281 B1
(45) Date of Patent: Dec. 4, 2001

(54) LASER WITH HARMONIC CAVITY (75) Inventor: Yusong Yin, Stony Brook, NY (US)

(73) Assignee: Photonics Industries International, Inc., Bohamia, NY (US)

( * ) Notice: Subject to any disclaimer, the term of this patent is extended or adjusted under 35 U.S.C. 154(b) by 0 days.

(21) Appl. No.: 09/415,345

(22) Filed: Oct. 9, 1999

(51) Int. Cl.[7] ........................................................ H01S 3/10
(52) U.S. Cl. ................... 372/22; 372/21; 372/97
(58) Field of Search ........................................ 372/21, 22

(56) References Cited

U.S. PATENT DOCUMENTS

| 5,206,868 | | 4/1993 | Deacon . | |
| 5,742,626 | | 4/1998 | Mead et al. . | |
| 5,898,717 | | 4/1999 | Yin . | |
| 6,061,370 | * | 5/2000 | Yin | 372/22 |
| 6,229,829 | * | 5/2001 | Yin | 372/22 |

* cited by examiner

Primary Examiner—Teresa M. Arroyo
Assistant Examiner—Davienne Monbleau
(74) Attorney, Agent, or Firm—James A. Quinton, Esq.

(57) ABSTRACT

According to the invention, a method and apparatus for generating an Nth harmonic frequency beam (N>2) is provided. A laser fundamental resonator cavity generates a preselected fundamental beam. The laser cavity comprises two fundamental beam reflective mirrors, which define the laser cavity, and a lasing medium. A 2nd or 3rd harmonic cavity is at least partially separate from and the fundamental cavity and at least partially overlaps the fundamental cavity. The harmonic cavity is formed between 2nd or 3rd harmonic beam reflective surfaces and contains a 2nd or 3rd harmonic generator, preferably a harmonic nonlinear crystal. The beam from the fundamental cavity is directed into the harmonic cavity to incident on the harmonic nonlinear crystal for converting at least a portion of the fundamental beam to a harmonic beam. An Nth (N>2) harmonic generator, preferably an Nth harmonic nonlinear crystal, is in optical communication with the 2nd or 3rd harmonic nonlinear crystal for providing an Nth harmonic output.

77 Claims, 4 Drawing Sheets

LASER WITH HARMONIC CAVITY

FIELD OF THE INVENTION

The field of the invention concerns a Nth (N>2) harmonic generation device, and in a particular a method and apparatus for generating a harmonic beam.

BACKGROUND OF THE INVENTION

Optical harmonic generation using nonlinear medium such as a crystal, provides a method for doubling, tripling or more generally producing the Nth harmonic of the frequency of electromagnetic radiation emitted by a laser or other high intensity source. The 3rd harmonic is produced by sum frequency generation of the laser fundamental and its 2nd harmonic beams through 2nd order nonlinearities of the nonlinear medium $(P(\ )=_0(3)*P_0(\ )*P_0(2))$. The common 3rd harmonic generation method, which is known in the art, combines the fundamental and the 2nd harmonic beam in a nonlinear crystal to generate its 3rd harmonic in the external laser cavity. For a high power laser, typical efficiency is limited to less than 25% of overall conversion efficiency, since unconverted fundamental beam and 2nd harmonic beams are wasted in that configuration. The overall conversion efficiency=$P(3)/P_0(\ )=_0(3)*_1(2)P_0^3(\ ))$ is less than 25% for even very high power pulsed Nd:YAG laser (see Continuum Product brochures).

Recent intracavity 3rd harmonic has improved conversion efficiency substantially. See for example U.S. Pat. No. 5,898,717. But unconverted 2nd harmonic is still wasted in those configurations.

The theory of intracavity 2nd harmonic generation (SHG) has been discussed by R. G. Smith, in the *I.E.E.E. Journal of Quantrum Electr.* QE-6, 215–223 (1970). Harmonic generations have been demonstrated in crystals such as $LiNbo_3$, BaNa $(NbO_3)$; $Lio_3$, KDP, $KTiOP_4$, BBO, $LiB_3O_5$, and $CsLiB_6O_{10}$. $LiB_3O_5$ is also referred to as LBO crystal and $CsLiB_6O_{10}$ is referred to as CLBO.

4th harmonic generation is known in the art. See U.S. Pat. No. 5,206,868. Resonance cavity is built to produce harmonics for single longitudinal mode has been demonstrated. However, the cavity is rather complicated and sometime the device is not practically useful. Multi-longitudinal mode lasers are more popular and easier to maintain. 5th harmonic generation is also known see: U.S. Pat. No. 5,742,626. Improved efficiency and more practical harmonic generations are sought for harmonic generation lasers.

SUMMARY OF THE INVENTION

According to the invention, a method and apparatus for generating an Nth harmonic frequency beam (N>2) is provided. In one aspect of the invention, a laser fundamental resonator cavity is provided for generating a preselected fundamental beam. The laser cavity includes a lazing medium, preferably a lazing crystal located between fundamental beam reflective surfaces preferably a first and second fundamental beam reflective mirrors which define the laser cavity. A 2nd or 3rd harmonic cavity is provided preferably a 2nd harmonic cavity optionally both a 2nd and 3rd harmonic cavity. The 2nd or 3rd harmonic cavity is at least partially separate from the laser fundamental cavity and at least partially overlaps the laser fundamental beam cavity. The harmonic cavity is formed between 2nd or 3rd harmonic beam reflective surfaces, preferably a first and second reflective mirrors preferably a first and second reflective surfaces having a second or 3rd harmonic generator preferably a harmonic nonlinear crystal located between reflective surfaces along the harmonic optical axis which extends between the first and second harmonic reflective surfaces. The fundamental beam from the laser fundamental cavity is directed into the harmonic cavity to incident on the harmonic nonlinear crystal for converting at least a portion of the fundamental beam to a harmonic beam. An Nth (N>2) harmonic generator preferably an Nth harmonic nonlinear crystal is in optical communication with the 2nd or 3rd harmonic nonlinear crystal. In the case of an Nth harmonic generator N>3, a 3rd harmonic cavity may be provided either alone or in combination with a 2nd harmonic cavity. When N=3 only a 2nd harmonic cavity is used. According to the invention, the harmonic beam is directed across the Nth (N>2) harmonic nonlinear crystal for conversion of the harmonic beam to a preselected Nth (N>2) harmonic beam. The resulting laser device efficiently converts the harmonic beam to a Nth (N>2) harmonic beam. Unconverted fundamental beam is directed back across the lazing medium for amplification. Desirably an output coupler for the Nth (N>2) harmonic beam is provided for directing Nth (N>2) harmonic beam outside the laser cavity. Typically, the Nth harmonic beam provided according to the invention is 3rd, 4th or 5th harmonic beam. According to the invention, improved conversion of fundamental and harmonic beam to Nth(N>2) is achieved. In addition, the power output of Nth(N>2) harmonic beam is enhanced.

According to the invention, the laser medium can be selected depending on the desired laser characteristics such as laser fluorescent lifetime, thermal Lansing, optical and mechanical properties. Preferably Nd:YAG, Nd:YLF; $Nd:YVO_4$ crystals are used. Optionally Nd, Er, Ho doped glasses or crystals are used as well as Ti:Sapphire, Cr:LiSaf or other lazing medium.

Useful in this invention are a type I or II phase matching nonlinear crystal for 2nd harmonic generation and type I or type II phase matching crystal for 3rd harmonic generation. In a type I phase matching crystal for 2nd harmonic generation, the fundamental beam is polarized orthogonal to that of resulting second harmonic beam. In a type I phase matching crystal for 3rd harmonic generation, the fundamental beam and 2nd harmonic beam incident on the type I crystal in parallel polarization to one another and produce a 3rd harmonic beam with perpendicular polarization to the 1st and 2nd harmonic beams. In a type II phase matching crystal for 3rd harmonic generation, the fundamental beam and 2nd harmonic beam are orthogonally polarized and produce a 3rd harmonic beam with its polarization parallel to the polarization of one of the input beams (for example in a type II LBO crystal the polarization of the fundamental beam (1064 nm) and the 3rd harmonic beam (355 nm) will be parallel). Also useful are 4th and 5th harmonic generation crystals.

The preferred embodiment of the present invention is illustrated in the drawings and examples. However, it should be expressly, understood that the present invention should not be limited solely to the illustrative embodiment.

DETAILED DESCRIPTION OF THE INVENTION

According to the invention, a method and apparatus for generating an Nth harmonic frequency beam (N>2) is provided. In one aspect of the invention, a laser fundamental cavity is provided for generating a preselected fundamental beam. The laser cavity includes a lazing medium, preferably a lazing crystal located between a first and second fundamental beam reflective surfaces which define the laser cavity. According to the invention, the lazing medium can be selected depending on the desired laser characteristics such as laser fluorescent lifetime, thermal Lansing, optical and mechanical properties. Desirably a laser crystal is provided according to the invention. Preferably Nd:YAG, Nd:YLF; Nd:YVO$_4$ are used, optionally Nd, Er, Ho doped glasses or crystals are used as well as Ti:Sapphire, Cr:LiSaf or other preselected lazing medium. A 2nd or 3rd harmonic cavity preferably 2nd harmonic optionally both a 2nd and a 3rd harmonic cavity is provided. The harmonic cavity is at least partially separate from the fundamental cavity and at least partially overlaps the laser fundamental cavity. The harmonic cavity is formed between a first and second reflective surface having a 2nd or 3rd harmonic generator preferably a 2nd or 3rd or both harmonic nonlinear crystal(s) located between the harmonic reflective surfaces along the harmonic optical axis which extends between the first and second harmonic reflective surfaces. Examples of suitable crystals include LiNbo$_3$, BaNa (NbO$_3$); LiO$_3$, KDP, KTiOPO$_4$ CsLiB$_6$O$_{10}$, BBO and LBO, preferably BBO and LBO and CLBO.

Optionally other nonlinear generators can be used. For example periodically poled crystals such as periodically poled LiNbo$_3$ (PPLN) or periodically poled glass fibers (PPGF) are used. The fundamental beam within the fundamental laser resonator cavity is directed into the 2nd or 3rd harmonic cavity preferable a 2nd harmonic cavity to incident on the 2nd or 3rd harmonic nonlinear generator preferable 2nd harmonic desirably a 2nd or 3rd harmonic nonlinear crystal for converting at least a portion of the fundamental beam to a 2nd or 3rd harmonic beam preferably 2nd harmonic. An nth (N>2) harmonic generator preferably an Nth harmonic nonlinear crystal is located in optical communication with the harmonic nonlinear crystal. According to the invention, the harmonic beam (2nd or 3rd or both) is directed across the Nth (N>2) harmonic nonlinear crystal for conversion of the harmonic beam preferably 2nd harmonic to a preselected Nth (N>2) harmonic beam. Depending on the type of crystal, the fundamental beam may be directed across Nth harmonic crystal along with the $2^{nd}$ or $3^{rd}$ harmonic beams. Examples of Nth(N>2) harmonic crystal include LBO, EBO, CLBO. The resulting laser device efficiently converts 2nd or 3rd harmonic beam to Nth (N>2) harmonic beam. Typically, the Nth harmonic provided according to the invention is 3rd, 4th or 5th harmonic beam. As a result, improved conversion of fundamental and 2nd or 3rd harmonic beam to Nth(N>2) is achieved. In addition, the power output of Nth(N>2) harmonic beam is enhanced. In the case of N>3, the 3rd harmonic cavity may be provided either alone or in combination with the 2nd harmonic cavity particularly for 5th harmonic generation. The 3rd harmonic cavity is at least partially separate and partially overlaps the laser fundamental cavity.

The etalon effect limits the number of longitudinal modes within the fundamental laser resonator cavity. According to the invention, it is preferred that multiple longitudinal modes are encouraged within the laser cavity. Desirably the components inside the cavity should be wedge shaped to minimize the etalon effect.

Figure 1:
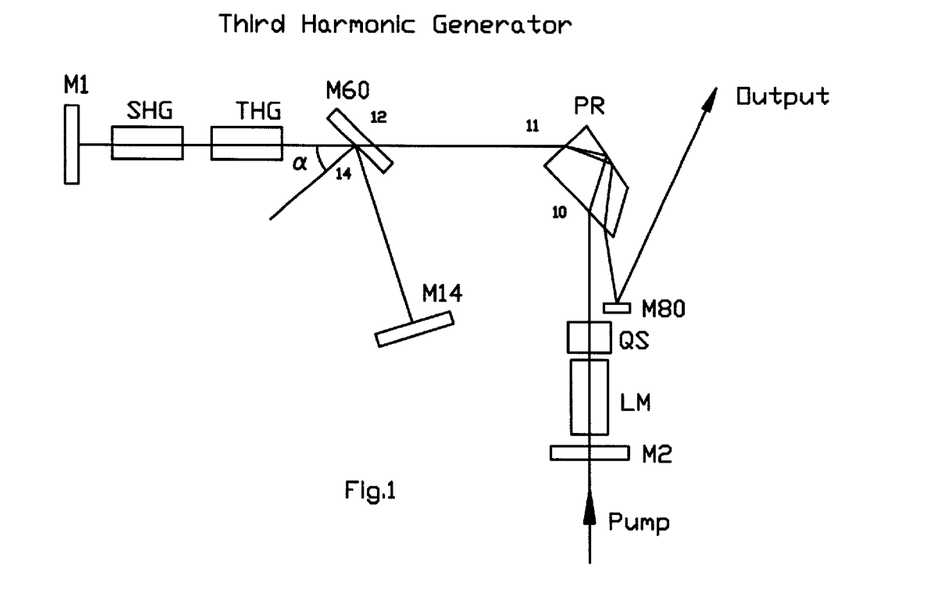
FIG. 1 is a schematic view of a laser according to the invention.

According to the invention a laser for generating a Nth (N>2) harmonic output beam is provided. Referring to FIG. 1 a device for generating a 3rd harmonic beam is provided. According to the invention, a laser fundamental beam resonator cavity is formed between reflecting surfaces preferably two reflecting surfaces desirably reflecting mirrors M1 and M2 which are located at either end of the a laser cavity. Within the laser cavity is a lazing medium desirably a laser crystal preferably an Nd:YAG, Nd:YLF or Nd:YVO$_4$ crystal. In FIG. 1, a Nd:YAG or Nd:YVO$_4$ crystal is provided which lases at a wavelength of about 1064 nm. Other lazing medium or crystals can be used. A fundamental beam optical axis is formed between mirrors M1 and M2. Mirror M1 is highly reflective for fundamental beam (1064 nm for Nd:YAG or Nd:YVO$_4$) and highly reflective for 2nd harmonic (532 nm for ND:YAG or ND:YVO$_4$) and highly reflective for 3rd harmonic (355 nm for ND:YAG or Nd:YVO$_4$). Mirror M2 is highly reflective for fundamental beam (1064 nm). An optional q-switch QS can be provided. A 2nd harmonic cavity is provided between 2nd harmonic reflective surfaces. Preferably the 2nd harmonic reflective surfaces are highly reflective mirrors M14 and M1. Mirror M14 is highly reflective for 2nd harmonic beam and mirror M1 is shared with the laser cavity. Optionally, an additional reflective surface can be provided so that the 2nd harmonic cavity shares no cavity forming mirror with the laser fundamental resonator cavity. The lazing medium LM lases at a preselected fundamental frequency and provides a fundamental beam of electromagnetic radiation which travels along a fundamental beam optical axis which extends between mirrors M1 and M2. A 2nd harmonic cavity as shown in FIG. 1 is formed between mirrors M1 and M14. A 2nd harmonic optical axis extends between M14 and M1. The 2nd harmonic cavity and the 2nd harmonic optical axis are partially separate from and partially overlap the laser fundamental beam resonator cavity and the fundamental beam optical axis. Within the 2nd harmonic optical cavity, along the 2nd harmonic optical axis is located a 2nd harmonic generator SHG preferably a 2nd harmonic nonlinear crystal desirably a LBO or BBO type I nonlinear crystal which is located in optical communication with the fundamental beam produced by the lazing medium LM. Desirably the lazing medium is located in a part of the fundamental beam cavity that is separate from the harmonic beam cavity. Fundamental beam is introduced into the 2nd harmonic cavity and travels along a part of the 2nd harmonic optical axis. A 3rd harmonic nonlinear crystal for example a LBO or BBO type I or II 3rd harmonic nonlinear crystal, desirably a type II THG is provided in optical communication with the 2nd harmonic crystal and with the fundamental beam propagating from the lazing medium. A beam separator such as prism desirably a dispersion prism, a separating mirror or both a prism and a separating mirror are provided. Desirably a dichroic mirror M60 and prism PR are provided. M60 is located along both the fundamental beam and the 2nd harmonic optical axis desirably at the intersection of the optical axis. Mirror M60 highly transmits fundamental and 3rd harmonic beam on both sides 12 and 14 and highly reflects 2nd harmonic on side 14. Desirably dichroic mirror M60 is oriented at or near (within 10 degrees) the Brewster angle, for the fundamental beam so that fundamental beam will be transmitted through the mirror 60 in both directions at minimal loss. In FIG. 1, the Brewster angle is about 56 degrees for UV Graded fused Silica. The angle is desirably, about +10 degrees from the Brewster angle that is from 46 to 66 degrees preferably about 56 degrees. Optionally sides 12 and 14 of mirror M60 can be coated to transmit fundamental beam. A prism preferably a dispersion prism desirably a Pellin-Broca prism PR is provided between mirror M60 and laser medium LM to separate 3rd harmonic from fundamental beam and direct third harmonic outside the cavity. The fundamental beam is directed back across the laser material. Preferably the 3rd harmonic beam is directed to mirror M80 which is highly reflective for 3rd harmonic and directs the output of the laser outside the cavity.

In operation the laser lases at its fundamental frequency. For Nd:YAG laser or Nd:YVO$_4$ the laser can lase at a fundamental wavelength of 1064 nm, preferably at a P-polarization referenced to M60 and PR. The fundamental beam propagating from the lasing crystal is directed through dispersion prism PR which is highly transmissive at "P" polarization on both input and exit faces, dichroic mirror M60 which is highly transmissive for fundamental wavelength 1064 nm at P polarization on sides 12 and 14. The fundamental beam then passes through M60 and is directed to the 3rd harmonic generator. Preferably a 3rd harmonic crystal, for example an LBO or BBO type I or II preferably type II crystal is provided. Such a crystal will have no affect on the fundamental beam unless it incidents on the crystal along with 2nd harmonic beam satisfying phase matching conditions. Since the beams make multiple passes according to the invention, except on the first pass, 2nd harmonic and fundamental incident together on the 3rd harmonic generator. Thus, a portion of the fundamental and a portion of 2nd harmonic beam will be converted to 3rd harmonic. The beams propagating from THG are then directed to 2nd harmonic generator SHG. The fundamental beam incidents on the 2nd harmonic generator, preferably a 2nd harmonic crystal, for example, a LBO type I or type II preferably type I crystal. A portion of the fundamental beam is converted to 2nd harmonic beam. Any 3rd harmonic beam present will be unaffected. Mirror M1 which is highly reflective for fundamental (1064 nm), 2nd harmonic (532 nm) and 3rd harmonic beams (355 nm) then reflects the 2nd and 3rd harmonic and the unconverted fundamental beam back across the 2nd harmonic generator where a portion of the fundamental beam is again converted to 2nd harmonic beam. The 2nd and 3rd harmonic and the fundamental beam then incident on the 3rd harmonic generator THG, preferably a LBO type II nonlinear crystal where a portion of the 2nd harmonic and a portion of the fundamental beam are converted into 3rd harmonic beam.

The beams leaving the 3rd harmonic crystal have different polarization. Mirror M60 transmits fundamental beam and 3rd harmonic beam incidenting at P polarization to the mirror. For this example, P polarization referenced to M60 is equivalent to horizontal polarization and S polarization referenced to mirror M60 is equivalent to vertical polarization. The fundamental beam is at horizontal or P polarization. The 2nd harmonic beam is at vertical or S polarization. The 3rd harmonic is at P or horizontal polarization. The three beams then incident on the dichroic mirror M60 which is highly reflective for 2nd harmonic beams at S polarization and highly transmissive for fundamental and 3rd harmonic beam at P polarization. The fundamental and 3rd harmonic beams pass through Mirror M60 and are directed to dispersion prism PR which spatially separates the fundamental beam from the 3rd harmonic beam. The fundamental beam is then directed back to the lasing medium for amplification in the laser crystal LM. The separated 3rd harmonic beam is then directed outside the cavity as the laser output. Desirably mirror M80 can be provided to direct the 3rd harmonic beam outside the cavity. The 2nd harmonic beam is directed to mirror M14 which is highly reflective for 2nd harmonic. The 2nd harmonic beam is then reflected back within the 2nd harmonic cavity and reflected by mirror M60 across the 3rd harmonic crystal THG. The 2nd harmonic beam incidents on the THG in the presence of fundamental beam from the lasing crystal so that a portion of the 2nd harmonic beam and fundamental beams are converted to 3rd harmonic beam. The beams then incident on the 2nd harmonic crystal SHG where additional fundamental beam is converted to 2nd harmonic.

Figure 2:
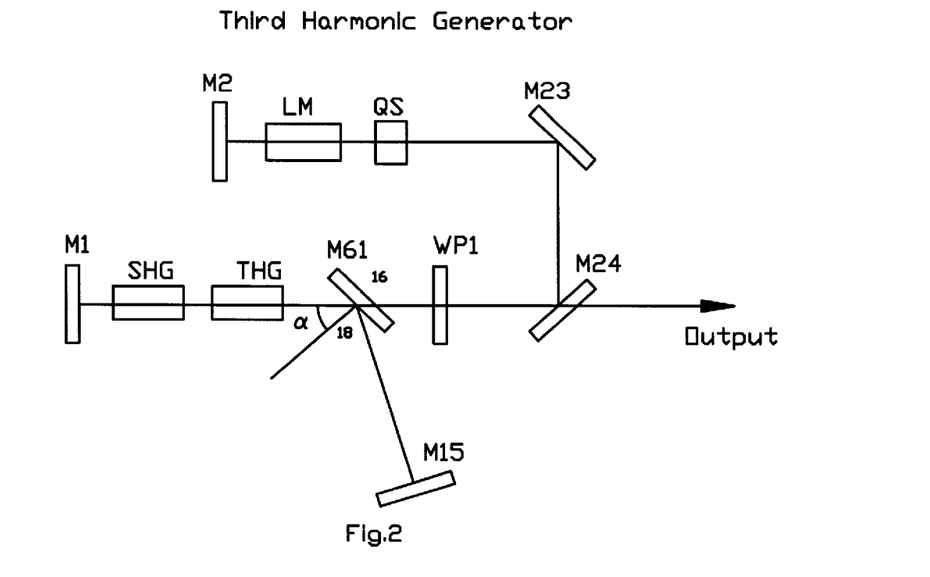
FIG. 2 is a schematic view of an alternative embodiment of a laser according to the invention.

Referring now to FIG. 2, an alternative embodiment of a 3rd harmonic generator according to the invention is provided. The 3rd harmonic generator of FIG. 2 includes a folded fundamental resonator cavity for compactness. Reflective surfaces desirably mirrors M2 and M1 define the laser fundamental beam resonator cavity. Mirror M2 is highly reflective for fundamental wavelength beam 1064 nm in the case of an Nd:YAG or Nd:YVO$_4$ laser. A fundamental beam optical axis is provided between M2 and M1. Mirror M1 is highly reflective for fundamental, 2nd and 3rd harmonic wavelength beams eg. 1064 nm, 532 nm and 355 nm respectively for Nd:YAG or Nd:YVO$_4$ shown in FIG. 2. Mirror M23 is provided within the laser fundamental beam cavity formed between M2 and M1 to direct the fundamental beam to mirror M24. Mirror M23 is highly reflective for fundamental beam eg. 1064 nm and desirably highly transimisive for $3^{rd}$ harmonic @355 nm. Mirror M24 is highly reflective for fundamental wavelength beam and highly transmissive for 3rd harmonic wavelength beam @ 355 nm. An optional waveplate WP1 which rotates the polarization multi-wave of fundamental beam and rotates the polarization a half wave of $3^{rd}$ harmonic beam is provided. After fundamental and $3^{rd}$ harmonic beams pass through WP1, the polarization of the fundamental beam remains the same vertically polarized; the polarization of $3^{rd}$ harmonic beam is rotated 90 degree from vertical polarized to horizontal polarized. The transmission through M24 is improved if the polarization of $3^{rd}$ harmonic beam is "P" polarized when it incidents on it. A beam separator preferably dichroic mirror 61 is provided. M61 is highly transmissive for both the fundamental wavelength beam (1064 nm) and $3^{rd}$ harmonic beam (355 nm) on both sides 16 and 18. M61 is highly reflective for 2nd harmonic wavelength beam, 532 nm on side 18. Mirror M61 is desirably orientated at or near (+10 degrees) the Brewster angle to optical axis and at "P" polarization's of fundamental and $3^{rd}$ harmonic beams (vertical polarized). As a result, the polarization of $2^{nd}$ harmonic beam will be "S" (horizontal) referenced to M61. The Brewster angle is approximately 56 degrees here. Optionally mirror M61 can be coated to transmits the desired fundamental and $3^{rd}$ harmonic beams on the side 16 if the angle is not at or near Brewster angle.

A 2nd harmonic cavity is formed between reflective surfaces preferably mirrors M15 and M1. Mirror M1 is highly reflective for fundamental, 2nd harmonic and 3rd harmonic beams. A 2nd harmonic generator SHG, preferably a 2nd harmonic crystal is located within the 2nd harmonic cavity along the 2nd harmonic optical axis extending between mirrors M1 and M15. A 3rd harmonic generator THG in optical communication with the 2nd harmonic generator SHG along the 2nd harmonic optical axis is provided within the 2nd harmonic cavity as well.

In operation a laser medium lasing at a preselected fundamental frequency, for example an Nd:YAG or Nd:YVO$_4$ lasing at a fundamental wavelength of 1064 nm is provided. The fundamental beam is directed to mirror M23 where it is reflected to mirror M24 where then it is reflected through optional waveplate WP1 to dichroic mirror M61 which is highly transmissive for fundamental beam and 3$^{rd}$ harmonic beam on both sides 16 and 18 and highly reflective for 2nd harmonic wavelength beam on side 18 of mirror M61. The fundamental beam passes through mirror M61 and incidents on the 2nd harmonic crystal, SHG, where a portion of the fundamental beam is converted to 2nd harmonic. The fundamental beam and 2nd harmonic beams are then directed to 3rd harmonic crystal THG where a portion of the fundamental beam and a portion of 2nd harmonic beam are converted to 3rd harmonic. The 2nd harmonic, 3rd harmonic and the fundamental beams propagating from the 3rd harmonic generator THG incident on mirror M1 where they are reflected by mirror M1 for a 2nd pass across the nonlinear crystals. A portion of the fundamental beam and a portion of 2nd harmonic beam are again converted to 3rd harmonic in the 3rd harmonic generator THG. The beams are then directed to the 2nd harmonic generator and incident on the 2nd harmonic crystal where a portion of the fundamental beam is converted to 2nd harmonic beam. The three beams are directed to mirror M61. The 3rd harmonic beam passes through mirror M61 and is then directed through optional waveplate WP1 for 90 degree polarization rotation to "P" polarization to M24. The 3rd harmonic beam is then directed to mirror 24 which functions as an output coupler for 3rd harmonic beam. Mirror M24 is highly reflective for fundamental beam. Unconverted fundamental passes through mirror 61 and is reflected by mirror M24 to mirror M23 where it is directed across laser medium LM for further amplification. Unconverted 2nd harmonic beam is reflected by dichroic mirror M61 and directed to M15 where it is reflected by mirror M15 which is highly reflective for 2nd harmonic beam to mirror M61 which reflects the unconverted 2nd harmonic beam back across the 3rd harmonic crystal, in the presence of fundamental beam traveling along that portion of the 2nd harmonic optical axis. Additional 2nd harmonic beam is formed through SHG. The 2nd harmonic beam and fundamental beam pass across the 3rd harmonic crystal where additional 3rd harmonic beam is formed. All three beams are reflected by M1 back across the 3rd harmonic crystal where additional 3rd harmonic beam is formed when the fundamental beams and 2nd harmonic beams incident again on the 3rd harmonic crystal. Additional 2nd harmonic beam is formed when fundamental beam passes across the 2nd harmonic crystal. The 3rd harmonic beam is then transmitted by mirror M61 to mirror M24 where it is directed outside the cavity as the laser output.

Figure 3:
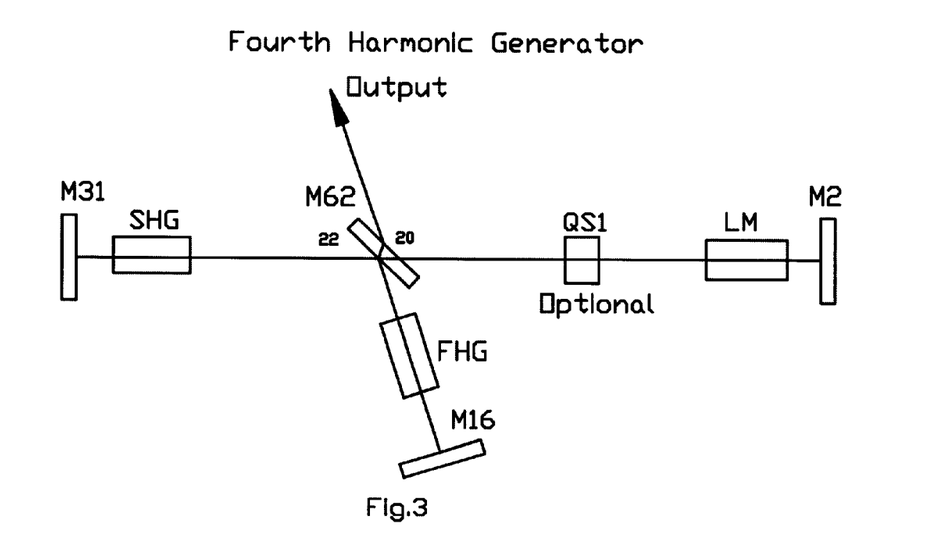
FIG. 3 is a schematic view of an alternative embodiment of a laser according to the invention.

Referring now to FIG. 3 an alternate embodiment of an Nth harmonic generation laser according to the invention is shown. In particular FIG. 3 shows a 4th harmonic generation laser. A laser fundamental beam cavity is formed between a first fundamental beam reflective surface M31 and a second fundamental beam reflective surface M2. Within the laser cavity is a laser medium LM such as a laser crystal. For example an Nd:YAG, Nd:YLF, Nd:YVO$_4$, Ti:Saphire or other laser crystal which would produce a preselected fundamental frequency laser beam of electromagnetic radiation can be used. An optional Q-switch QS can be provided. A 2nd harmonic cavity is provided between the 2nd harmonic reflective surfaces mirror M16 and mirror M31. The 2nd harmonic cavity has a 2nd harmonic cavity optical axis along the optical path between mirrors M16 and M31. The optical axis for the laser fundamental beam cavity follows the optical path between mirrors M2 and M31. The laser fundamental beam optical axis partially overlaps and is partially separated from the 2nd harmonic cavity optical axis. Within the 2nd harmonic cavity is located a 2nd harmonic generator, preferably a 2nd harmonic nonlinear crystal, most preferably a LBO type I or II, BBO type I or II or other suitable nonlinear crystal for producing a 2nd harmonic beam from a preselected fundamental wavelength, for example for a 1064 nm beam produced by a Nd:YAG or Nd:YVO$_4$ laser. A beam separator, preferably dichroic mirror M62 is provided desirably located at the intersection of the laser fundamental cavity optical axis and the 2nd harmonic optical axis. A 4th harmonic generator, preferably a 4th harmonic generation crystal for example, a BBO or KDP or CLBO 4th harmonic generation crystal is provided between beam separator preferably dichroic mirror M62 and mirror M16 along the 2nd harmonic optical axis. Beam separator preferably dichroic mirror M62 is highly reflective for 2nd harmonic beam which for an Nd:YAG or Nd:YVO$_4$ is 532 nm and highly transmissive for both fundamental beam @1064 nm and 4th harmonic beam 266 nm here. The side 22 is coated to be highly transmissive for both fundamental and 4$^{th}$ harmonic beams (1064 nm and 266 nm here) and highly reflective for 2$^{nd}$ harmonic beam (532 nm here). The side 20 is either uncoated when the incident angle is at or near Brewster angle or anti-reflection coated for the fundamental and 4$^{th}$ harmonic beams (1064 nm and 266 nm) when the incident angle is not at or near the Brewster angle. In operation, the fundamental beam cavity is activated by pumping the laser medium LM by diode laser or lamp or other exitation means for example an Nd:YAG or Nd:YVO$_4$ which would then lase at a wavelength of 1064 nm. The fundamental beam is directed into the 2nd harmonic cavity where it passes through beam separator preferably dichroic mirror M62 and is directed across a 2nd harmonic generator SHG where a portion of the fundamental beam is converted to 2nd harmonic beam. Both fundamental beam and 2nd harmonic beams are directed to mirror M31. Mirror M31 is highly reflective to both fundamental beam and 2nd harmonic beam. Both fundamental beam and 2nd harmonic beams are reflected back across crystal SHG where additional portion of fundamental beam is converted to 2nd harmonic beam. The fundamental and 2nd harmonic beams are then directed to beam separator preferably mirror M62 where the fundamental beam is transmitted and directed to the laser medium LM for further amplification. The 2nd harmonic beam is reflected by M62 along the 2nd harmonic optical axis to incident on 4th harmonic crystal FHG where a portion of the 2nd harmonic beam is converted to 4th harmonic. The 4th and 2nd harmonic beams are directed to mirror M16. Mirror M16 is highly reflective to both 4th harmonic and 2nd harmonic and both are then reflected back across the 4th harmonic crystal where additional 2nd harmonic is converted to 4th harmonic. The 2nd and 4th harmonic beams are then directed to mirror M62 which is highly transmissive to 4th harmonic. The 4th harmonic beam is directed outside cavity as the output of the laser device. The 2nd harmonic beam is reflected by M62 back through the 2nd harmonic generation crystal to mirror M31 and reflected back through the 2nd harmonic generator and is again reflected by mirror M62 for another pass through the 4th harmonic generator for additional conversion of 2nd harmonic to a 4th harmonic.

Figure 4:
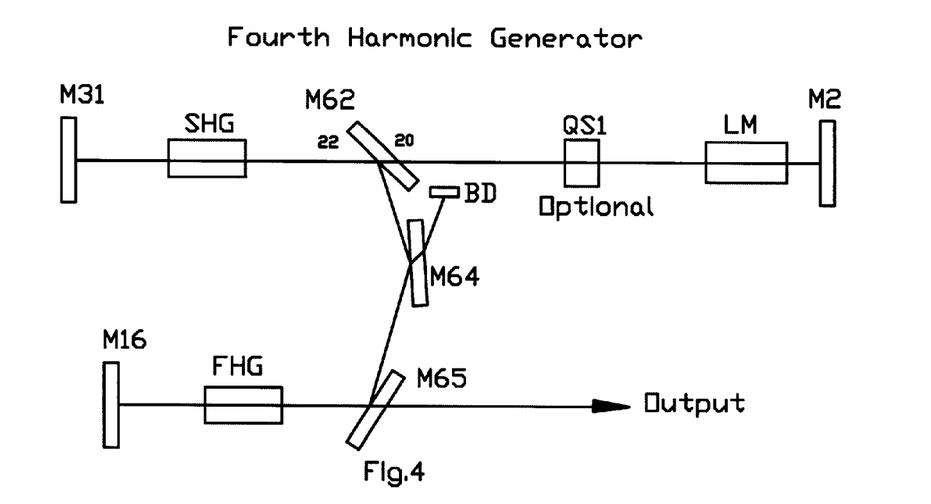
FIG. 4 is a schematic view of an alternative embodiment of a laser according to the invention.

FIG. 4 shows a further alternative embodiment of the invention. FIG. 4 is similar to FIG. 3 for 4th harmonic generation. Generally ultraviolet (UV) beams, particularly beams under 300 nm encountered in 4th harmonic beams can be destructive to the various mirrors and crystals used in the laser cavities. Beams at the upper end of the ultraviolet range between 300 nm and 400 nm can also be destructive. It is desirable to limit unnecessary contact by the mirrors or crystals with ultraviolet beam, particularly a 4th or 5th harmonic beam. In FIG. 4 beam separator M62 of FIG. 3 is replaced by a series of three beam separators preferably dichroic mirrors M62, M64 and M65. Even when a mirror is highly transmissive for a particular wavelength beam, there is a small portion that is reflected. Similarly even a highly reflective mirror will transmit some of the beam. It is desirable to prevent unintended transmission or reflection of ultraviolet radiation. In FIG. 4 similar to FIG. 3, a fundamental beam cavity is provided between mirror M2 and M31. A 2nd harmonic beam cavity is provided between mirror M16 and M31. A beam separator preferably dichroic mirror, M62 is provided at the intersection of the 2nd harmonic optical axis and the fundamental beam optical axis. Beam separator M62 is described previously. Mirror M64 is located along the 2nd harmonic optical axis between mirrors M62 and M65 in optical communication with mirrors M62 and M65. Mirror M64 is highly reflective for 2nd harmonic and highly transmissive for uv beams particularly 4th harmonic. Optional beam dumper BD is provided adjacent to mirror M64. Mirror M65 which is highly reflective for 2nd harmonic and highly transmissive for 4th harmonic is provided within the 2nd harmonic generator optical cavity in optical communication with mirror M64 and with 4th harmonic generator FHG.

In operation, the 2nd harmonic beam propagating from 2nd harmonic generator SHG and unconverted fundamental beam incident on the side 22 of dichroic mirror M62. The fundamental beam is transmitted for amplification by lasing medium LM. The 2nd harmonic beam is reflected by mirror M62 to incident on mirror M64 where it is reflected to mirror M65 that directs the 2nd harmonic beam across the 4th harmonic generator where a portion of the 2nd harmonic beam is converted to 4th harmonic beam. Mirror M16 reflects both the 4th harmonic and the unconverted 2nd harmonic for a second pass across the 4th harmonic generator FHG where an additional portion of the 2nd harmonic is converted to 4th harmonic. Dichroic mirror M65 which is highly transmissive for 4th harmonic acts as an output coupler for the 4th harmonic beam in this instance a beam of 266 nm for a Nd:YAG or Nd:YVO$_4$ crystal lasing at 1064 nm. A small portion of the 4th harmonic beam will be unintentionally reflected by the highly transmissive mirror M65 to mirror M64 which is also highly transmissive for 4th harmonic beam. Optional beam dumper BD is provided to block the dissipation of any 4th harmonic passing through mirror M64 outside the device. Alternatively the exiting beam can be used as a secondary UV output. With M62, M64 and M65, the amount of residual $4^{th}$ harmonic beam directed into the fundamental cavity is substantially reduced compared with The device of FIG. 3.

Figure 5:
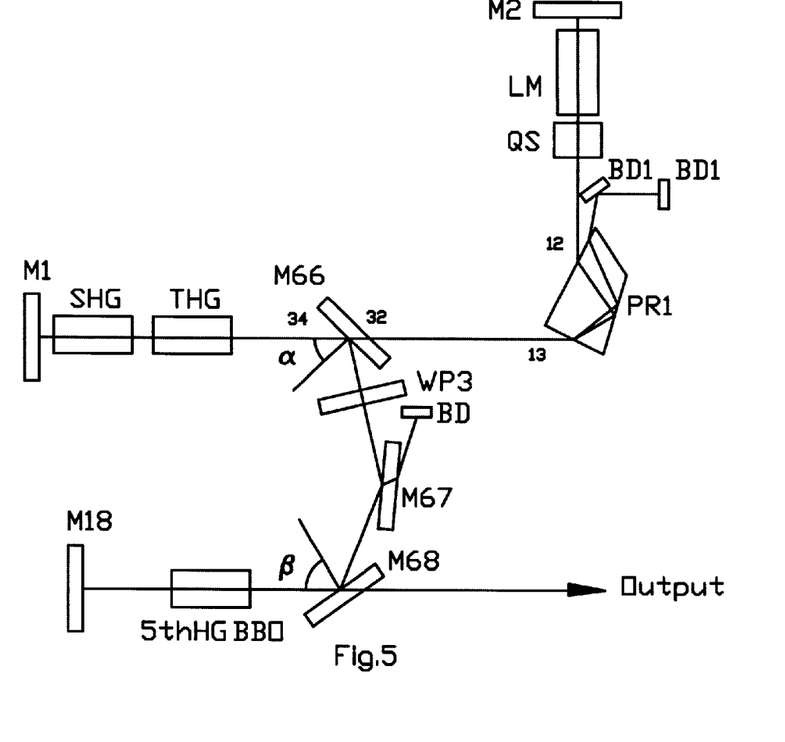
FIG. 5 is a schematic view of an alternative embodiment of a laser according to the invention.

Referring to FIG. 5, a 5th harmonic laser is provided. A fundamental beam optical axis is provided between the mirrors M2 and M1. The fundamental laser resonator cavity is provided between mirrors M2 and M1. The fundamental laser resonator cavity includes a laser medium LM as described above, and an optional Q-switch QS, a beam separator, desirably both dichoric mirror M66 and prism PR1. The fundamental beam is directed along the fundamental beam optical axis to a beam separator preferably dispersion prism PR1 and then to a separating mirror preferably dichroic mirror M66. Dichroic mirror M66 is highly transmissive on both sides 32 and 34 for fundamental beam and highly reflective on side 34 for 2nd and 3rd harmonic beams and preferably highly transmissive for 5th harmonic beam which is desirably removed from the cavity at M66. Either $2^{nd}$ or $3^{rd}$ harmonic or a combined 2nd and 3rd harmonic cavity is provided between Mirrors M1 and M18. The harmonic optical axis partially coincides with the fundamental beam optical axis of the laser fundamental beam cavity and is partially separate. The dichroic mirror M66 is preferably located at the intersection of the two optical axes which are partially separate and partially overlap. M66 reflects the 2nd and 3rd harmonic beam generated by SHG and THG to mirror M67, which is highly reflective for 2nd, 3rd harmonic beams(532 nm, 355 nm) and highly transmissive for $5^{th}$ harmonic beam(213 nm). In optical communication with M67 is mirror M68 which is located at or near the Brewster angle β for the 5th harmonic beam propagating from the 5th harmonic generator. Mirror M68 is highly reflective for 2nd and 3rd harmonic beam and highly transmissive for 5th harmonic. An optional beam dumper BD is provided adjacent to mirror M67 to receive any transmitted beam. An optional waveplate WP3 can be provided to adjust the polarization of the various beams between P and S polarization as desired. The waveplate WP3 rotates 2nd harmonic multi-waves and $3^{rd}$ harmonic half-wave. After passing through WP3 2nd and 3rd harmonic beams are polarized in the same direction vertical polarized. Prism PR1 generates displacement among different beams in order to separate one beam from another. A 2nd harmonic generator SHG is provided within the 2nd harmonic cavity along the harmonic optical axis. A 3rd harmonic generator THG is also provided along the harmonic optical axis in optical communication with the 2nd harmonic generator. A 5th harmonic generator 5thHG desirably a type I BBO crystal for sum frequency generation 2w+3w is provided within the harmonic cavity. Preferably the 5th harmonic generator is located between mirror M66 and mirror M18 along the harmonic optical axis.

In operation the laser medium LM preferably Nd:YAG or Nd:YVO$_4$ laser crystal lases and produces a fundamental beam at a wavelength of 1064 nm. The fundamental beam is directed through beam separator preferably dispersion prism PR1 on side 12 and exit on the side 13 with incident and exit angle at about Brewster angle. For example, when this prism PR1 is made of UV graded fused silica, the Brewster angle is about 55.6 degrees. Also, PR1 transmission favors "P" polarized beam and discourage "S" polarized beam. The laser lases primarily at "P" or horizontal polarization. After passing through PR1, the fundamental beam is directed to dichroic mirror M66 which on both sides 32 and 34 is highly transmissive to fundamental beam. Preferably mirror M66 is orientated at or near (±10 degrees) the Brewster angle of approximately 56 degrees to the laser fundamental beam resonator cavity optical axis. The fundamental beam is directed along the harmonic beam optical axis to incident on a 3rd harmonic generator THG. The type II LBO 3rd harmonic crystal only converts fundamental beam to 3rd harmonic in the presence of 2nd harmonic beam where type II phase matching condition is met. On the first pass, the fundamental beam will then pass unconverted. In this multipass device on subsequent passes, 2nd harmonic will be present and 3rd harmonic beam will be formed. The unconverted fundamental beams will then incident on the SHG where a portion of the fundamental beam will be converted to 2nd harmonic. The fundamental 2nd and 3rd harmonic beams propagating from the 2nd harmonic generator SHG will be reflected by mirror M1 which is highly reflective for fundamental, 2nd and 3rd harmonic beams. The fundamental, 2nd and 3rd harmonic beams will be reflected back across the 2nd harmonic crystal where an additional portion of the fundamental beam will be converted to 2nd harmonic. The 2nd harmonic and fundamental beams then will propagate from the 2nd harmonic crystal and incident on 3rd harmonic crystal. There portions of the fundamental and 2nd harmonic beams will be converted to 3rd harmonic. The three frequency beams then incident on a beam separator preferably mirror M66. The fundamental wavelength beam is transmitted by mirror M66 and is directed to laser medium LM for amplification through PR1. Residual 3rd harmonic beam transmitted by M66 is displaced by PR1 and blocked by BD1 or can be used for other purposes. The 2nd and 3rd harmonic beams are reflected by side 34 of mirror M66 and directed to the optional waveplate WP3. Waveplate WP3 is provided to adjust the polarizations of the beams. In this embodiment waveplate WP3 is multiwave for 532 nm and half wave for 3rd harmonic 355 nm. The resulting 2nd and 3rd vertical polarized harmonic beams are directed through mirror M67 and M68 across the 5th harmonic BBO crystal for sum frequency generation 2w+3w where a portion of the 2nd and 3rd harmonic are converted to 5th harmonic beam. Both M67 and M68 are highly reflective for both 2nd and 3rd harmonic beams and highly transmissive for 5th harmonic beam with horizontal polarization. The beams propagating from the 5th harmonic generator are directed to mirror M18. The 2nd, 3rd and 5th or $2^{nd}$ and $5^{th}$ or $3^{rd}$ and $5^{th}$ harmonic beams are reflected by mirror M18 which is highly reflective for 2nd, 3rd and 5th or $2^{nd}$ and $5^{th}$ or $3^{rd}$ and $5^{th}$ harmonic beams. The unconverted 2nd or/and 3rd harmonic beams as well as the 5th harmonic beam pass again through 5th harmonic generator 5thHG for example a BBO 5th harmonic crystal where a portion of the 2nd and 3rd harmonic beams are converted to additional 5th harmonic beam. The 5th harmonic beam propagating from the 5th harmonic generator is directed to mirror M68 which is highly transmissive for a 5th harmonic (213 nm) and removed as the output. The unconverted 2nd and 3rd harmonic beams are reflected by mirror M68 through M67, WP3 and M66 to incident on 3rd harmonic generator THG in the presence of fundamental beam. When 2nd and 3rd harmonic beams pass through WP3, the 3rd harmonic beam polarization rotates 90 degree to horizontal polarization, and 2nd harmonic polarization remains the same vertical polarization. The unconverted fundamental beam incidents on 2nd harmonic crystal SHG and a portion is converted to 2nd harmonic beam. The process then continues as long as fundamental beam is delivered to mirror M66.

Figure 6:
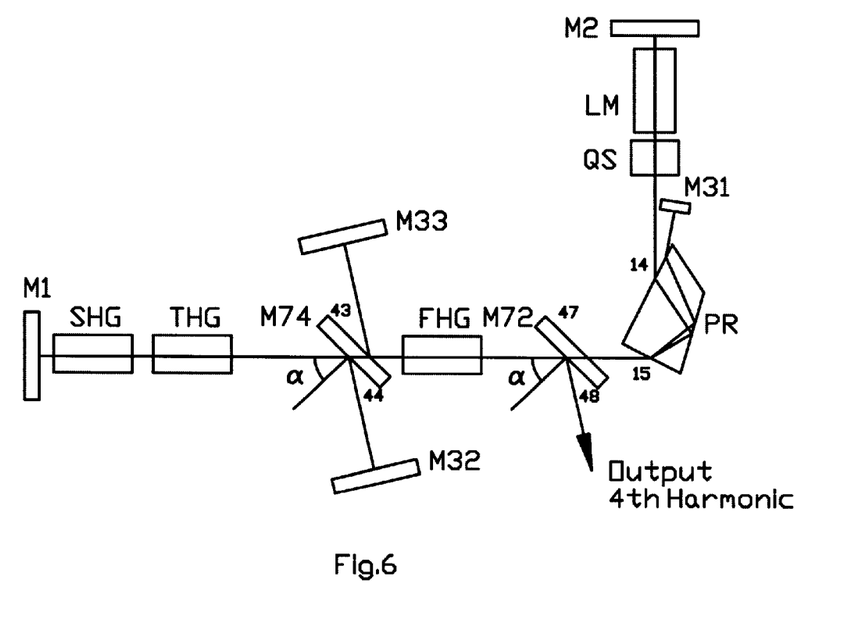
FIG. 6 is a schematic view of an alternative embodiment of a laser according to the invention.

FIG. 6 depicts a 4th harmonic laser according to the invention. In FIG. 6 a fundamental beam cavity is provided between reflecting surfaces preferably mirrors M1 and M2. Laser medium such as a Nd:YAG, Nd:YLF or Nd:YVO$_4$ laser medium LM is provided within the laser cavity. An optional Q-switch QS is provided. The fundamental beam optical axis extends between mirror M2 and mirror M1. According to the invention, both a 2nd harmonic and a 3rd harmonic cavities are provided. In this embodiment the 2nd and 3rd harmonic cavities are partially separate and partially overlap one another. The 2nd and 3rd harmonic beam cavities partially overlap and are partially separate from the fundamental beam cavity. Desirably the laser medium is located in the portion of the fundamental cavity that does not overlap the harmonic cavities. A 2nd harmonic cavity is provided between reflecting surfaces desirably reflecting mirror M32 and mirror M1. A 3rd harmonic cavity is provided between reflecting surfaces desirably mirror M31 and mirror M1. Mirror M32 is highly reflective for 2nd harmonic beam. Mirror M31 is highly reflective for 3rd harmonic beam. Mirror M1 is highly reflective for fundamental, 2nd and 3rd harmonic beams. The 2nd harmonic optical axis extends between mirror M32 and mirror M1. A beam separator, preferably a separating mirror, desirably a dichroic mirror M74 is provided within the 2nd harmonic cavity along its optical axis. Side 43 of mirror M74 is highly transmissive for fundamental and 3rd harmonic beam, and highly reflective for 4th harmonic beam. On side 44, mirror M74 is highly reflective for 2nd harmonic beam and highly transmissive for fundamental and 3rd harmonic beams. Mirror M33 is provided in optical communication with side 43 of dichroic mirror M74. Mirror M33 is highly reflective for 4th harmonic beam and receives 4th harmonic beam that is reflected by side 43 of mirror M74. The 3rd harmonic cavity is provided between mirrors M31 and mirror M1. Mirror M31 is highly reflective for 3rd harmonic beam. A beam separator preferably a separating mirror desirably a dichroic mirror M72 is located at a point along both the fundamental and 3rd harmonic optical axis. Mirror 72 highly transmits both fundamental and 3rd harmonic beam on both sides 47 and 48 and highly reflects 4th harmonic beam on the side 48 to outside of the cavity as the laser output. A 2nd harmonic generator preferably type I or type II 2nd harmonic crystal such as type I LBO crystal and a 3rd harmonic generator preferably type I or type II third harmonic crystal such as type II LBO crystal are provided between M1 and M74. A 4th harmonic generator preferably 4th harmonic crystal such as type I LBO crystal is provided between M72 and M74. A Beam separator preferably dispersion prism PR2 is provided to separate the fundamental beam from 3rd harmonic beam and for an unintended transmitted of 4th harmonic beam from M72.

In operation the laser medium LM is pumped by external pumping source such as laser diodes or lamp. Fundamental beam resonates along the optical axis between mirrors M2 and M1. The fundamental laser beam is directed through dispersion prism PR2 by entering port 14 and exiting port 15 at about Brewster angle. As the result, the resonator cavity favors "P" (horizontal) polarized fundamental beam and discriminates against "S" (vertical) polarized beam. After passing through PR2, the fundamental beam is then directed across 4th harmonic generator FHG through M72. After the first pass 3rd harmonic beam will also be propagating through the 4th harmonic generator. The 4th harmonic generator in this embodiment is preferably a type I LBO crystal for 4th harmonic generation which converts fundamental beam in the presence of 3rd harmonic beam to 4th harmonic beam when the phase matching condition met. The fundamental, 4th harmonic and 3rd harmonic beams propagating from 4th harmonic crystal FHG, incident on beam separator M74 where the 4th harmonic beam is reflected to mirror M33 which is highly reflective at 4th harmonic beam. Fundamental and 3rd harmonic beams are transmitted by mirror M74 where they pass through 3rd harmonic generator THG. The 3rd harmonic generator is desirably a type II LBO crystal. In such a 3rd harmonic crystal fundamental beam and 2nd harmonic beam are converted to 3rd harmonic beam in the presence of one and another. The beams propagating from 3rd harmonic generator THG are then directed across 2nd harmonic generator where a portion of the fundamental beam is converted to 2nd harmonic beam. The fundamental, 2nd and 3rd harmonic beams propagating from 2nd harmonic generator are then directed to mirror M1 which reflects fundamental, 2nd and 3rd harmonic beams back across the 2nd harmonic generator where an additional portion of the fundamental beam is converted to 2nd harmonic beam. The 2nd harmonic and fundamental beams again pass across the 3rd harmonic generator where portions of the fundamental and 2nd harmonic beams in the presence of one another are converted to third harmonic. Beams propagating from third harmonic generator THG are then directed back to beam separator M74 where the 2nd harmonic beam is reflected to mirror M32 which then reflect 2nd harmonic beam back within the 2nd harmonic cavity for a further pass across the 3rd harmonic generator for further conversion to 3rd harmonic beam. The fundamental and 3rd harmonic beam are transmitted by mirror M74 and directed towards 4th harmonic generator where a portion of the fundamental beam, and a portion of third harmonic beam in the presence of one another are converted to 4th harmonic. Mirror M33 reflects 4th harmonic beam that had been generated on the previous pass through 4th harmonic generator back to dichroic mirror M74 where it is reflected back across the 4th harmonic crystal to mirror M72. Side 48 of mirror M72 is highly reflective for 4th harmonic beam and directs 4th harmonic outside the cavity as the output of the laser. 3rd harmonic and fundamental beams are highly transmitted by mirror M72 and pass through dispersion prism PR2. The $3^{rd}$ harmonic beam is separated from the fundamental beam and directed to the mirror M31 which then reflect it back through PR2 all the way to M1 which form the $3^{rd}$ harmonic cavity. The fundamental beam is directed to the LM for amplification and to M2 to reflect back to the LM for further amplification. As a result an efficient high powered 4th harmonic laser is provided.

Figure 7:
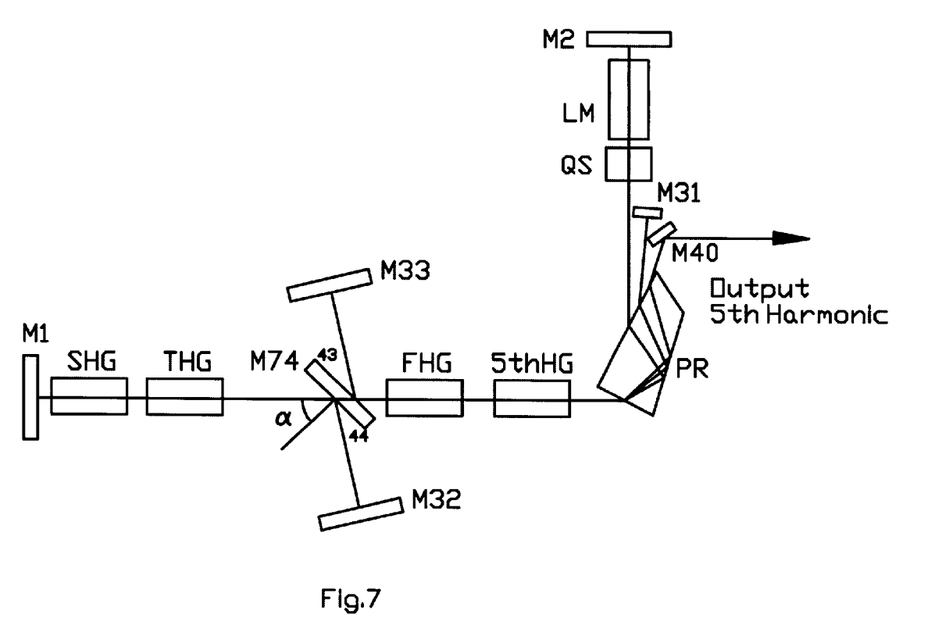
FIG. 7 is a schematic view of an alternative embodiment of a laser according to the invention.

Referring to FIG. 7, a 5th harmonic generator according to the invention is provided. In FIG. 7, a fundamental beam cavity is provided between Mirrors M2 and M1 having a laser medium LM and an optional q-switch QS. A 2nd harmonic cavity having a 2nd harmonic optical axis is provided between Mirror M32 and Mirror M1. A 3rd harmonic cavity is provided between Mirror M1 and Mirror M31. The 3rd harmonic and the 2nd harmonic cavities partially overlap and are partially separate from the fundamental beam optical cavity. The 3rd harmonic and the 2nd harmonic cavities are partially separate and partially overlap one another. A beam separator such as a separating mirror or a dispersion prism, preferably dichoric mirror M74 is provided within the laser at a point where the 2nd, 3rd and fundamental beam optical axis overlap. The dichoric mirror M74 is highly reflective for 2nd harmonic and transmissive for 3rd harmonic on side 44. Mirror M74 is highly transmissive for fundamental beam propagating in either direction through the mirror and highly reflective for 4th harmonic beam on side 43. As discussed above, with regard to FIG. 6, it is desirable that the Mirror M74 be oriented along the fundamental beam and 3rd harmonic optical axes at or near the Brewster angle to enhance transmission of fundamental and 3rd harmonic beam at P-polarization. However, the mirror M-74 may alternatively be coated for transmission of fundamental and 3rd harmonic beam. A 4th harmonic generation preferably a 4th harmonic non-linear crystal FHG for sum frequency generation 1w+3w is provided in optical communication with the 3rd harmonic generator preferably within the 3rd harmonic optical cavity. A 5th harmonic generator preferably a 5th harmonic nonlinear crystal for sum frequency generation 1w+4w is provided in optical communication with the 4th harmonic generator and in optical communication with the laser medium LM along the fundamental beam optical axis. A beam separator preferably a dispersion prism PR is provided along the fundamental beam optical axis and along the 3rd harmonic optical axis in communication with the 5th harmonic beam propagating from the 5th harmonic generator. The prism PR spatially separates $3^{rd}$, 4th, 5th and fundamental beams. Prism PR directs 5th harmonic beam to mirror M40 which reflects 5th harmonic beam outside the cavity as the output of the laser. Prism PR directs 3rd harmonic beam to mirror M31 where it is reflected back within the 3rd harmonic cavity to mirror M1. Prism PR direct fundamental beam along the fundamental beam optical axis back to laser medium LM for amplification.

In operation, laser medium LM is pumped by lamp or laser diodes or other pumping sources. Fundamental beam is directed through prism PR. Preferably prism PR is oriented at or near the Brewster angle for transmission of fundamental beam at P polarization at both input and exit sides. The fundamental beam is then directed to the 5th harmonic generator where it is unaffected. The fundamental beam propagating from the 5th harmonic generator is then directed across the fourth harmonic generator FHG for sum generation 1w+3w. On the first pass, the fundamental beam will beam unaffected. However, on subsequent passes across the 4th harmonic generator 3rd harmonic beam will be present and a portion of the fundamental and 3rd harmonic beam will be converted to 4th harmonic beam. The fundamental, 3rd and 4th harmonic beams propagating from the 4th harmonic generator will be directed to mirror M74. The fundamental and 3rd harmonic beams will be transmitted through M74 and the 4th harmonic beam will be reflected to mirror M33. The 4th harmonic beam incidents on mirror M33 which is highly reflective for 4th harmonic beam M33 reflects the 4th harmonic beam back to mirror M74 which is highly reflective for $4^{th}$ harmonic beam on side 43. The 4th harmonic beam is then reflected back through 4th harmonic generator for a further pass through the 5th harmonic generator. The transmitted fundamental and 3rd harmonic beams are then directed across 3rd harmonic generator THG (1w+2w) where the fundamental beam on the first pass will be unaffected. On each subsequent pass 2nd harmonic beam will be present and a portion of the fundamental beam and 2nd harmonic will be converted to 3rd harmonic. The fundamental, 3rd and 2nd harmonic beams propagating from THG are then directed across 2nd harmonic generator SHG where a portion of the fundamental beam is converted to 2nd harmonic beam. The fundamental, 2nd harmonic and 3rd harmonic beams propagating from the 2nd harmonic generator SHG are then directed to mirror M1 which reflects the three beams back across the 2nd harmonic generator where an additional portion of the fundamental beam is converted to 2nd harmonic. The beams propagating from the 2nd harmonic generator SHG are then directed across the 3rd harmonic generator THG where a portion of the fundamental and 2nd harmonic beams are converted to 3rd harmonic beams. The fundamental and 2nd harmonic and 3rd harmonic beams propagating from the 2nd harmonic generator SHG are then directed to dichoric mirror M74. Mirror M74, which is highly reflective for second harmonic beam reflects 2nd harmonic beam to mirror M32 which is highly reflective for 2nd harmonic beam. The 2nd harmonic beam is then reflected by M32 back to M74 for an additional pass across the 3rd harmonic and 2nd harmonic generator. The fundamental and 3rd harmonic beams are transmitted by mirror M74 and incident on 4th harmonic generator FHG where a portion of the fundamental and 3rd harmonic beams are converted to 4th harmonic beam. Additional 4th harmonic beam is also present having been reflected by mirror M33. The 4th harmonic, 3rd harmonic and fundamental beams propagating from 4th harmonic generator are then directed across the 5th harmonic generator 5th HG where a portion of the 4th harmonic and fundamental beam are converted to 5th harmonic beam. The 4th harmonic, 5th harmonic and fundamental beams are then directed to prism PR where the beams are spatially separated by the dispersion PR into three separate beams. Fundamental beam is then directed to the laser medium LM for amplification. The 3rd harmonic beam is directed to reflecting mirror M31 for which reflects the 3rd harmonic beam back within the third harmonic cavity. 4th harmonic beam is directed to a beam blocker BD which removes the unconverted 4th harmonic beam from the cavity. The 5th harmonic beam is directed to mirror M40, which reflects the 5th harmonic beam outside the cavity as the output of the laser.

The foregoing is considered as illustrative only to the principles of the invention. Further, since numerous changes and modification will occur to those skilled in the art, it is not desired to limit the invention to the exact construction and operation shown and described above, and accordingly, all suitable modifications and equivalents may be resorted to, falling within the scope of the invention.

What is claimed is:

1. A laser for generating a Nth(N>2) harmonic beam comprising:
   a laser fundamental beam resonator cavity formed between a first fundamental beam reflective surface and a second fundamental beam reflective surface;
   a laser medium located between said first and second fundamental beam reflective surfaces for generating a fundamental beam;
   said laser fundamental beam cavity having a fundamental beam optical axis;
   a 2nd or 3rd harmonic beam cavity at least partially separate from said laser fundamental beam cavity and at least partially overlapping said laser fundamental beam cavity;
   said harmonic cavity formed between a first harmonic beam reflective surface and a second harmonic beam reflective surface;
   said harmonic cavity having a harmonic optical axis;
   a 2nd or 3rd harmonic nonlinear generator located in said harmonic cavity along said harmonic optical axis for converting at least a portion of said fundamental beam to a 2nd or 3rd harmonic beam;
   means to direct said fundamental beam into said harmonic cavity along said harmonic optical axis for incidenting on said 2nd or 3rd harmonic generator;
   a beam separator to remove unconverted fundamental beam from said harmonic cavity;
   means to direct said separated fundamental beam across said laser medium for amplification;
   a Nth (N>2) harmonic generator in optical communication with said 2nd or 3rd harmonic generator for conversion of said 2nd or 3rd harmonic beam to a Nth (N>2) harmonic beam;
   2nd or 3rd harmonic beam directing means to direct said 2nd or 3rd harmonic beam across said Nth(N>2) harmonic nonlinear crystal, to form a Nth(N>2) harmonic beam.

2. The laser according to claim 1 further comprising a Nth (N>2) harmonic output coupler for directing said Nth (N>2) harmonic beam outside the harmonic cavity.

3. The laser according to claim 2 wherein said 2nd or 3rd harmonic generators and said nth harmonic generator are nonlinear crystals.

4. The laser according to claim 3 wherein said nonlinear crystal is selected from the group of $LiNbo_3$, $BaNa(Nbo_3)$, $LiO_3$, KDP, $KTiOPO_4$, BBO, LBO and CLBO.

5. The laser according to claim 4 wherein said nonlinear crystals are selected from the group of LBO nonlinear crystals and BBO nonlinear crystals.

6. The laser according to claim 5 wherein said fundamental beam and harmonic optical axis's intersect;
   said beam separator includes a dichroic mirror located at the intersection of said fundamental beam and said harmonic optical axis's.

7. The laser according to claim 6 wherein said dichroic mirror is highly transmissive to fundamental beam and highly reflective to 2nd harmonic, 3rd harmonic or both 2nd and 3rd harmonic.

8. The laser according to claim 7 wherein said dichroic mirror is located at or near the Brewster angle to the fundamental optical axis.

9. The laser according to claim 8 wherein said dichroic mirror is located at about the Brewster angle α to the fundamental beam optical axis.

10. The laser according the claim 9 wherein said laser medium is selected from the group consisting of Nd:YAG, Nd:YLF and Nd:$YVO_4$.

11. The laser according to claim 10 wherein said first and second fundamental beam reflective surfaces are high reflecting mirrors for fundamental beam.

12. The raser according to claim 11 wherein said first and second harmonic beam reflective surfaces are high reflecting mirrors for said 2nd or 3rd harmonic beam.

13. The laser according to claim 10 wherein said first fundamental beam reflective surface and said first harmonic beam reflective surface are provided by a single mirror said single mirror high reflecting for both fundamental beam and 2nd or 3rd harmonic beam.

14. The laser according to claim 3 wherein said 2nd or 3rd harmonic beam cavity and said 2nd or 3rd harmonic generator are 2nd harmonic and said nth harmonic beam is 3rd harmonic.

15. The laser according to claim 3 wherein said 2nd or 3rd harmonic beam cavity and said 2nd or 3rd harmonic generator are 2nd harmonic and said Nth harmonic beam is 4th harmonic.

16. The laser according to claim 3 wherein said 2nd or 3rd harmonic beam cavity and said 2nd or 3rd harmonic generator are 2nd harmonic and said Nth harmonic is 5th harmonic.

17. The laser according to claim 3 wherein said 2nd or 3rd harmonic beam cavity and said 2nd or 3rd harmonic generator are 3rd harmonic and said Nth harmonic is 4th harmonic.

18. The laser according to claim 3 wherein said 2nd or 3rd harmonic beam cavity and said 2nd or 3rd harmonic generator are 3rd harmonic and said Nth harmonic is 5th harmonic.

19. The laser according to claim 3 further comprising a 2nd and a 3rd harmonic cavity and a 2nd and 3rd harmonic generator, said Nth harmonic is 4th or 5th harmonic.

20. The laser according to any one of claims 1 wherein said laser medium is located in a part of said fundamental beam cavity that is separate from said harmonic cavity.

21. A laser for generating a 3rd harmonic beams comprising:
   a laser fundamental beam resonator cavity formed between a first fundamental beam reflective surface and a second fundamental beam reflective surface;

a lasing medium located between said first and second fundamental beam reflective surfaces for generating a fundamental beam;

said laser fundamental beam cavity having a fundamental beam optical axis;

a 2nd harmonic beam cavity at least partially separate from said laser fundamental beam cavity and at least partially overlapping said laser fundamental beam cavity;

said harmonic cavity formed between a first harmonic beam reflective surface and a second harmonic beam reflective surface;

said harmonic cavity having a harmonic optical axis;

a 2nd harmonic nonlinear generator located in said harmonic cavity along said harmonic optical axis for converting at least a portion of said fundamental beam to a 2nd harmonic beam;

means to direct said fundamental beam into said harmonic cavity along said harmonic optical axis for incidenting on said 2nd harmonic generator;

a beam separator to remove unconverted fundamental beam from said harmonic cavity;

means to direct said separated fundamental beam across said laser medium for amplification;

a 3rd harmonic generator located in said harmonic cavity in optical communication with said 2nd harmonic generator for conversion of said 2nd harmonic beam to a 3rd harmonic beam in the presence of fundamental beam;

means to direct fundamental beam across said 3rd harmonic generator;

2nd harmonic beam directing means to direct said 2nd harmonic beam across said 3rd harmonic nonlinear crystal in the presence of fundamental beam to form a 3rd harmonic beam.

22. The laser according to claim 21 further comprising a 3rd harmonic output coupler for directing said 3rd harmonic beam outside the harmonic cavity.

23. The laser according to claim 22 wherein said 2nd harmonic generator and said 3rd harmonic generator are nonlinear crystals.

24. The laser according to claim 23 wherein said nonlinear crystal is selected from the group of $LiNbo_3$, BaNA ($Nbo_3$), $LiO_3$, KDP, $KTiOPO_4$ BBO and LBO and CLBO.

25. The laser according to claim 24 wherein said nonlinear crystals are selected from the group of LBO nonlinear crystals and BBO nonlinear crystals.

26. The laser according to claim 25 wherein said fundamental and harmonic optical axis's intersect;

said beam separator including a dichroic mirror located at the intersection of said fundamental beam and said harmonic optical axises.

27. The laser according to claim 26 wherein said dichroic mirror is highly transmissive to fundamental beam and highly reflective to 2nd harmonic or both 2nd and 3rd harmonic beams.

28. The laser according to claim 27 wherein said dichroic mirror is located at or near the Browser to the fundamental beam optical axis.

29. The laser according to claim 28 wherein said diachronic mirror is located at about the Browser angle to the fundamental beam axis.

30. The laser according to claim 29 wherein said laser medium is selected from the group consisting of Nd:YAG, Nd:YLF and $Nd:YVO_4$.

31. The laser according to claim 30 wherein said first and second fundamental beam reflective surfaces are high reflecting mirrors for fundamental beam.

32. The laser according to claim 31 wherein said first and second harmonic beam reflective surfaces are high reflecting mirrors for said 2nd harmonic beam.

33. The laser according to claim 30 wherein said first fundamental beam reflective surface and said first harmonic beam reflective surface are provided by a single mirror said single mirror, high reflecting for both fundamental beam and 2nd harmonic beam.

34. The laser according to claim 33 wherein said laser medium is located in a part of said fundamental beam cavity that is separate from said harmonic cavity.

35. A laser for generating a 4th harmonic beam, said 4th harmonic beam being an ultraviolet beam comprising:

a laser fundamental beam resonator cavity formed between first fundamental beam reflective surface and a second fundamental beam reflective surface;

a laser medium located between said first and second fundamental beam reflective surfaces for generating a fundamental beam;

said laser fundamental beam cavity having a fundamental beam optical axis;

a 2nd or 3rd harmonic beam cavity at least partially separate from said laser fundamental beam cavity and at least partially overlapping said laser fundamental beam cavity;

said harmonic cavity formed between a first harmonic beam reflective surface and a second harmonic beam reflective surface;

said harmonic cavity having a harmonic optical axis;

a 2nd or 3rd harmonic nonlinear generator located in said harmonic cavity along said harmonic optical axis for converting at least a portion of said fundamental beam to a 2nd or 3rd harmonic beam;

means to direct said fundamental beam into said harmonic cavity along said harmonic optical axis for incidenting on said 2nd or 3rd harmonic generator;

a beam separator to remove unconverted fundamental beam from said harmonic cavity;

means to direct said separated fundamental beam across said lasing medium for amplification;

a 4th harmonic generator located in optical communication with said 2nd or 3rd harmonic generator for conversion of at least a portion said 2nd or 3rd harmonic beam to a 4th harmonic beam;

2nd or 3rd harmonic beam directing means to direct said 2nd or 3rd harmonic beam across said 4th harmonic nonlinear crystal, to form a 4th harmonic beam.

36. The laser according to claim 35 further comprising a 4th harmonic output coupler for directing said 4th harmonic beam outside the harmonic cavity.

37. The laser according to claim 36 wherein said 2nd or 3rd harmonic generator and said 4th harmonic generator are nonlinear crystals.

38. The laser according to claim 37 wherein said nonlinear crystal is selected from the group of $LiNbo_3$, BaNa ($Nbo_3$), $LiO_3$, KDP, $KTiOPO_4$, BBO, LBO and CLBO.

39. The laser according to claim 38 wherein said nonlinear crystals are selected from the group of LBO nonlinear crystals and BBO nonlinear crystals.

40. The laser according to claim 39 wherein said fundamental and harmonic optical axis's intersect;

said beam separator including a dichroic mirror located at the intersection of said fundamental and said harmonic optical axis.

41. The laser according to claim 40 wherein said dichroic mirror is highly transmissive to fundamental beam and highly reflective to 2nd harmonic, 3rd harmonic or both 2nd and 3rd harmonic.

42. The laser according to claim 41 wherein said dichroic mirror is located at or near the Brewster to the fundamental optical axis.

43. The laser according to claim 42 wherein said dichroic mirror is located at about the Brewster angle to the fundamental beam optical axis.

44. The laser according to claim 43 wherein said laser medium is selected from the group consisting of Nd:YAG, Nd:YLF and Nd:YVO$_4$.

45. The laser according to claim 44 wherein said first and second fundamental beam reflective surfaces are high reflecting mirror for fundamental beam.

46. The laser according to claim 45 wherein said first and second harmonic beam reflective surfaces are high reflecting mirrors for said 2nd or 3rd harmonic beam.

47. The laser according to claim 44 wherein said first fundamental beam reflective surface and said first harmonic beam reflective surface are provided by a single mirror, said single mirror high reflecting for both fundamental beam and 2nd or 3rd harmonic beam.

48. The laser according to claim 37 wherein said 2nd or 3rd harmonic beam cavity and said 2nd or 3rd harmonic generator are 2nd harmonic.

49. The laser according to claim 37 wherein said 2nd or 3rd harmonic beam cavity and said 2nd or 3rd harmonic generator are 3rd harmonic.

50. The laser according to claim 37 further comprising both a 2nd and 3rd harmonic beam cavity and both a 2nd or 3rd harmonic generator.

51. The laser according to claims 49 wherein said 4th harmonic generator is type I LBO crystal for conversion of 3rd harmonic beam in the presence for fundamental beam to 4th harmonic beam.

52. The laser according to claim 51 wherein said 4th harmonic output coupler is a first dichroic mirror said first dichroic mirror highly reflective for 2nd harmonic beam and highly transmissive for 4th harmonic beam to direct.

53. The laser according to claim 52 further comprising a second dichroic mirror in optical communication with reflected beams from said first dichroic mirror said second dichroic mirror highly reflective for second harmonic beam and highly transmissive for 4th harmonic beam whereby 4th harmonic beam is substantially removed from both the harmonic and fundamental beam cavities.

54. The laser according to claim 53 wherein said lasing medium is located in a part of said fundamental beam cavity that is separate from said harmonic cavity.

55. A laser for generating a 5th harmonic beam comprising:
   a laser fundamental beam resonator cavity formed between a first fundamental beam reflective surface and a second fundamental beam reflective surface;
   a laser medium located between said first and second fundamental beam reflective surfaces for generating a fundamental beam;
   said laser fundamental beam cavity having a fundamental beam optical axis;
   a 2nd or 3rd harmonic beam cavity at least partially separate from said laser fundamental beam cavity and at least partially overlapping said laser fundamental beam cavity;
   said harmonic cavity formed between a first harmonic beam reflective surface and a second harmonic beam reflective surface;
   said harmonic cavity having a harmonic optical axis;
   a 2nd or 3rd harmonic nonlinear generator located in said harmonic cavity along said harmonic optical axis for converting at least a portion of said fundamental beam to a 2nd or 3rd harmonic beam;
   means to direct said fundamental beam into said harmonic cavity along said harmonic optical axis for incidenting on said 2nd or 3rd harmonic generator;
   a beam separator to remove unconverted fundamental beam from said harmonic cavity;
   means to direct said separated fundamental beam across said lasing medium for amplification;
   a 5th harmonic generator in optical communication with said 2nd or 3rd harmonic generator for conversion of said 2nd or 3rd harmonic beam to a 5th harmonic beam;
   2nd or 3rd harmonic beam directing means to direct said 2nd or 3rd harmonic beam across said 5th harmonic nonlinear crystal, to form a 5th harmonic beam.

56. The laser according to claim 55 further comprising a 5th harmonic output coupler for directing said 5th harmonic beam outside the harmonic cavity.

57. The laser according to claim 56 wherein said 2nd or 3rd harmonic generators and said 5th harmonic generator are nonlinear crystals.

58. The laser according to claim 57 wherein said nonlinear crystal is selected form the group of LiNbo$_3$, BaNa(Nbo$_3$), LiO$_3$, KDP, KTiOPO$_4$, BBO, LBO and CLBO.

59. The laser according to claim 58 wherein said nonlinear crystals are selected from the group of LBO nonlinear crystals and BBO nonlinear crystals.

60. The laser according to claim 59 wherein said fundamental and harmonic optical axis's intersect;
   said beam separator including a dichroic mirror located at the intersection of said fundamental and said harmonic optical axis's.

61. The laser according to claim 60 wherein said dichroic mirror is highly transmissive to fundamental beam and highly reflective to 2nd harmonic, 3rd harmonic or both 2nd and 3rd harmonic.

62. The laser according to claim 61 wherein said dichroic mirror is located at or near the Brewster to the fundamental optical axis.

63. The laser according to claim 62 wherein said dichroic mirror is located at about the Brewster angle to the fundamental beam optical axis.

64. The laser according the claim 63 wherein said lasing medium is selected from the group consisting of Nd:YAG, Nd:YLF and Nd:YVO$_4$.

65. The laser according to claim 64 wherein said first and second fundamental beam reflective surfaces are high reflecting mirrors for fundamental beam.

66. The laser according to claim 65 wherein said first and second harmonic beam reflective surfaces are high reflecting mirrors for said 2nd or 3rd harmonic beam.

67. The laser according to claim 64 wherein said first fundamental beam reflective surface and said first harmonic beam reflective surface are provided by a single mirror said single mirror high reflecting for both fundamental beam and 2nd or 3rd harmonic beam.

68. The laser according to claim 67 wherein said 2nd or 3rd harmonic beam cavity and said 2nd or 3rd harmonic generator are 2nd harmonic.

69. The laser according to claim 65 wherein said 2nd or 3rd harmonic beam cavity and said 2nd or 3rd harmonic generator are 3rd harmonic.

70. The laser according to claim 65 wherein said 2nd or 3rd harmonic beam cavity and said 2nd or 3rd harmonic generator are both 2nd and 3rd harmonic.

71. The laser according to claim 65 wherein said 5th harmonic generator is a BBO crystal for conversion of 3rd harmonic beam in the presence of 2nd harmonic beam to 5th harmonic beam.

72. The laser according to claim 71 wherein said 5th harmonic output coupler is a first dichroic mirror said dichroic mirror highly reflective for 2nd and 3rd harmonic beam and highly transmissive for 5th harmonic beam.

73. The laser according to the claim 72 further comprising a second dichroic mirror in optical communication with reflected beams from said first dichroic mirror said second dichroic mirror highly reflective for second harmonic beam and high transmissive for 5th harmonic beam whereby 5th harmonic beam is substantially removed from both the harmonic and fundamental beam cavities.

74. The laser according to claim 73 wherein said laser medium is located in a part of said fundamental beam cavity that is separate from said harmonic cavity.

75. The laser according to claim 1 wherein the Nth harmonic generation is located within the harmonic cavity.

76. The laser according to claim 35 wherein the $4^{th}$ harmonic generator is located within said harmonic cavity.

77. The laser according to claim 55 wherein the $5^{th}$ harmonic generator is located within said harmonic cavity.

* * * * *